United States Patent
Lee et al.

(10) Patent No.: US 10,396,437 B2
(45) Date of Patent: Aug. 27, 2019

(54) MOBILE TERMINAL

(71) Applicant: LG ELECTRONICS INC., Seoul (KR)

(72) Inventors: Joohee Lee, Seoul (KR); Seungwoo Ryu, Seoul (KR); Jaewon Lee, Seoul (KR); Youngryoul Kim, Seoul (KR); Jaewan Kim, Seoul (KR); Wonwoo Lee, Seoul (KR); Junyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/987,320

(22) Filed: May 23, 2018

(65) Prior Publication Data

US 2019/0097307 A1   Mar. 28, 2019

Related U.S. Application Data

(60) Provisional application No. 62/561,692, filed on Sep. 22, 2017.

(30) Foreign Application Priority Data

Jan. 18, 2018   (KR) ........................ 10-2018-0006574

(51) Int. Cl.
*H01Q 1/24* (2006.01)
*H01Q 15/14* (2006.01)
*H04M 1/02* (2006.01)

(52) U.S. Cl.
CPC ............. *H01Q 1/243* (2013.01); *H01Q 15/14* (2013.01); *H04M 1/026* (2013.01)

(58) Field of Classification Search
CPC .......... H01Q 1/243; H01Q 15/14; H01Q 1/38; H01Q 9/0407; H01Q 9/065; H01Q 17/0001; H01Q 19/10; H01Q 1/245; H04M 1/026
See application file for complete search history.

(56) References Cited

U.S. PATENT DOCUMENTS

| | | | |
|---|---|---|---|
| 6,222,488 B1 * | 4/2001 | Pai-Chuan | H01Q 1/246 343/700 MS |
| 8,988,299 B2 * | 3/2015 | Kam | H01Q 1/2283 257/E21.499 |

(Continued)

*Primary Examiner* — Said M Elnoubi
(74) *Attorney, Agent, or Firm* — Birch, Stewart, Kolasch & Birch, LLP

(57) ABSTRACT

A mobile terminal including a body having a display unit mounted on a front surface of the body; a ground frame located on a back surface of the display unit and supporting the display unit; a first radiation element mounted on the body below the ground frame and configured to radiate an electromagnetic wave comprising a main lobe radiating in a backward direction of the mobile terminal toward a back surface of the body and a sub lobe radiating toward the front surface of the body; a metal plate disposed below the first radiation element and configured to reflect the electromagnetic wave comprising the main lobe in a forward direction to cause a surface wave along the ground frame and increase a size of the sub lobe radiating toward the front surface of the body; and a controller configured to apply power to the first radiation element to control the electromagnetic wave to be radiated.

17 Claims, 9 Drawing Sheets

(56) References Cited

U.S. PATENT DOCUMENTS

| | | | | |
|---|---|---|---|---|
| 2004/0023701 A1* | 2/2004 | Hankui | ................... | H01Q 1/244 |
| | | | | 455/575.7 |
| 2009/0295662 A1* | 12/2009 | Suetsuna | ................... | H01Q 1/48 |
| | | | | 343/787 |
| 2010/0035539 A1* | 2/2010 | Yoshida | ............... | H01Q 1/2225 |
| | | | | 455/1 |
| 2014/0071006 A1* | 3/2014 | Chan | ..................... | H01Q 9/0407 |
| | | | | 343/730 |
| 2016/0261036 A1* | 9/2016 | Sato | ......................... | G01S 7/02 |
| 2017/0033460 A1* | 2/2017 | Ayala Vazquez | .... | H01Q 13/103 |
| 2017/0214146 A1* | 7/2017 | Honkanen | .............. | H01Q 15/14 |
| 2017/0309991 A1* | 10/2017 | Noori | ..................... | H01Q 5/49 |
| 2017/0309992 A1* | 10/2017 | Noori | ................... | H01Q 1/2258 |
| 2018/0198202 A1* | 7/2018 | Shor | ........................ | H01Q 1/48 |

* cited by examiner (a)

(b)

(c)

(a)

(b)

(a)

(b)

MOBILE TERMINAL

CROSS-REFERENCE TO RELATED APPLICATIONS

This application claims priority to U.S. Provisional Application No. 62/561,692 filed on Sep. 22, 2017 and Korean Patent Application No. 10-2018-0006574 filed on Jan. 18, 2018, the entire contents of which are hereby incorporated by reference in their entirety.

BACKGROUND OF THE DISCLOSURE

Field of the Disclosure

The present disclosure relates to a mobile terminal having an array antenna for transmitting and receiving millimeter waves used in fifth generation (5G) mobile communication.

Background of the Disclosure

Terminals may be generally classified as mobile/portable terminals or stationary terminals according to mobility thereof. Mobile terminals may also be classified as handheld terminals or vehicle mounted terminals.

Mobile terminals have become increasingly more functional. Examples of such functions include data and voice communication, capturing images and video via a camera, recording audio, playing music files via a speaker system, and displaying images and video on a display. Some mobile terminals include additional functionality which supports gaming, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

As the functions of such terminals are expanded, various wireless communication schemes are applied to wirelessly transmit and receive data. As the multimedia function is extended, UHD quality moving images can be viewed or virtual reality (VR) content is available only through mobile communication. Accordingly, there is a need for a technology enabling quick exchange of a larger amount of data.

Thus, long-term evolution (LTE) communication (4G mobile communication) has emerged to transmit a larger amount of data quickly. LTE communication has evolved into LTE-A, wideband LTE, and the like which provide a transfer rate two times higher than that of the conventional technology. In this technology, in order to increase the transfer rate, two or more frequency bands may be used simultaneously, or frequency bandwidth is widened to increase the amount of transferred data. In this technology, the number of antennas is increased to widen the frequency band or to use signals of different frequency bands simultaneously.

Since there is a limit in widening the bandwidth or using signals of a plurality of bands, 5G mobile communication technology has emerged. 5G technology is not only advantageous for transmitting a large amount of data, but also ensures a high response speed unlike 4G mobile communication technology. Since a higher frequency band is used than in 4G mobile communication, a completely different type of antenna is required.

SUMMARY OF THE DISCLOSURE

An object of the present disclosure is the to provide a mobile terminal capable of securing wireless communication performance higher than or equal to certain performance regardless of the direction in which the mobile terminal having an antenna for transmitting and receiving millimeter waves used in 5G mobile communication is oriented.

To achieve these objects and other advantages and in accordance with the purpose of the present disclosure, as embodied and broadly described herein, a mobile terminal includes a body having a display unit mounted on a front surface thereof, a ground located on a back surface of the display unit, a first radiation element mounted on the body and configured to radiate an electromagnetic wave toward a back surface of the body, a controller configured to apply power to the first radiation element to control the electromagnetic wave to be radiated, and a metal plate configured to cover a back surface of the first radiation element to reflect, in a forward direction, the electromagnetic wave radiated from the first radiation element in a backward direction.

The mobile terminal according to the present disclosure can transmit electromagnetic wave energy toward the front surface of the mobile terminal even if the back surface of the mobile terminal touches a floor surface, thereby preventing performance degradation.

Further scope of applicability of the present disclosure will become apparent from the following detailed description. It should be understood, however, that the detailed description and specific examples, such as the preferred embodiments of the invention, are given by way of illustration only, since various changes and modifications within the spirit and scope of the invention will be apparent to those skilled in the art.

BRIEF DESCRIPTION OF THE DRAWINGS

The present invention will become more fully understood from the detailed description given hereinbelow and the accompanying drawings, which are given for illustration only, and thus are not limitative of the present invention, and wherein.

DETAILED DESCRIPTION OF THE INVENTION

Figure 1A:
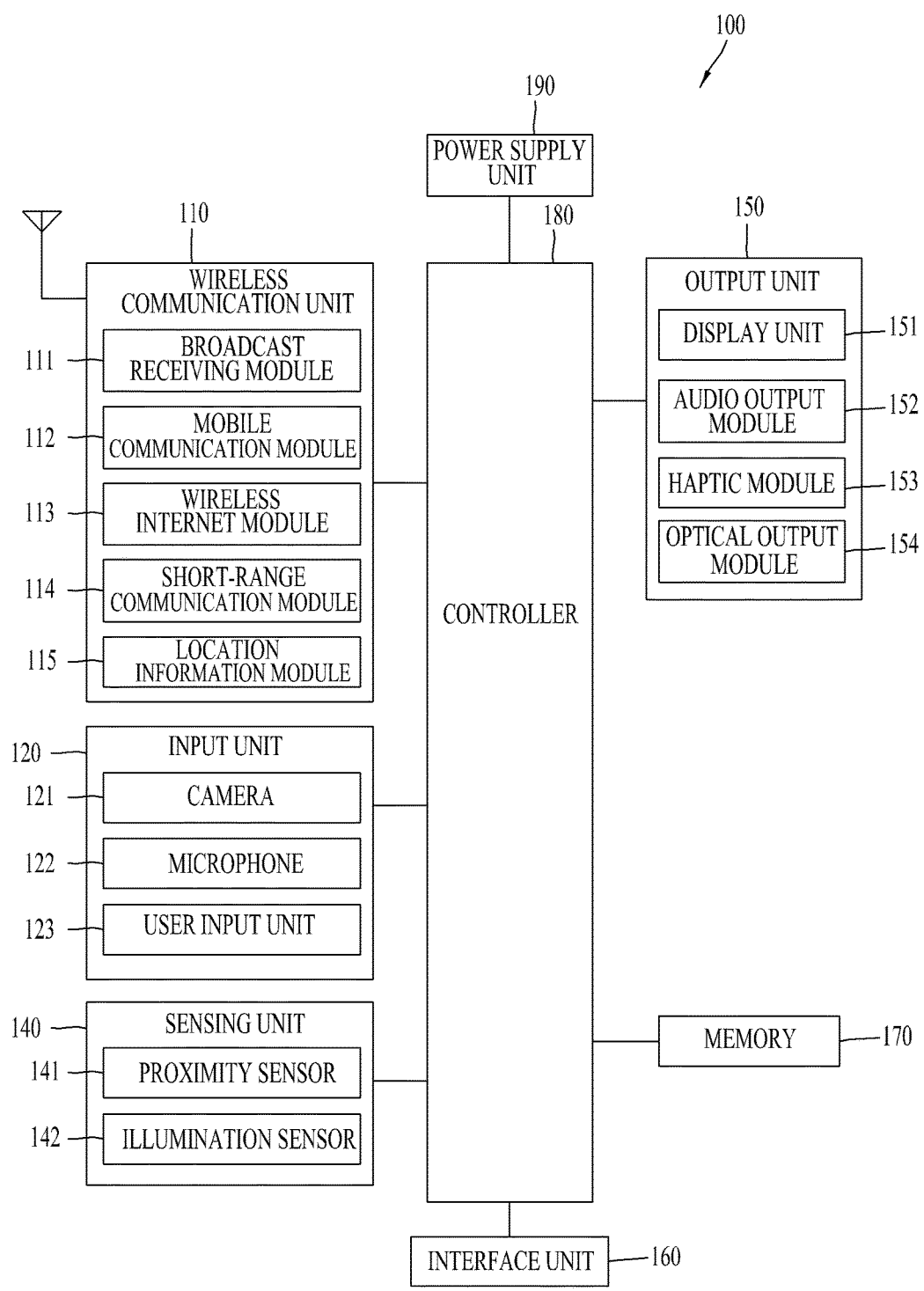
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" or "unit" may be used to refer to elements or components. Use of such a suffix herein is merely intended to facilitate description of the specification, and the suffix itself is not intended to have any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected to" another element, the element can be directly connected to the other element or intervening elements may also be present. In contrast, when an element is referred to as being "directly connected to" another element, there are no intervening elements present.

The terminology used in the present disclosure is used only to describe specific embodiments, and is not intended to limit the present disclosure. A singular representation may include a plural representation unless it represents a definitely different meaning from the context. Terms such as "includes" or "has" are used herein and should be understood that they are intended to indicate existence of several components, functions or steps, disclosed in the specification, and it is also understood that greater or fewer components, functions, or steps may likewise be utilized.

In general, a suffix such as "module" or "unit" may be used to refer to elements or components. Use of such a suffix herein is merely intended to facilitate description of the specification, and the suffix itself is not intended to have any special meaning or function.

Mobile terminals presented herein may be implemented using a variety of different types of terminals. Examples of such terminals include cellular phones, smartphones, user equipment, laptop computers, digital broadcast terminals, personal digital assistants (PDAs), portable multimedia players (PMPs), navigators, portable computers (PCs), slate PCs, tablet PCs, ultrabooks, wearable devices (for example, smart watches, smart glasses, head mounted displays (HMDs)), and the like.

By way of non-limiting example only, further description will be given with reference to particular types of mobile terminals. However, such teachings apply equally to other types of terminals, such as those types noted above. In addition, these teachings may also be applied to stationary terminals such as digital TVs, desktop computers, and the like.

Figure 1B:
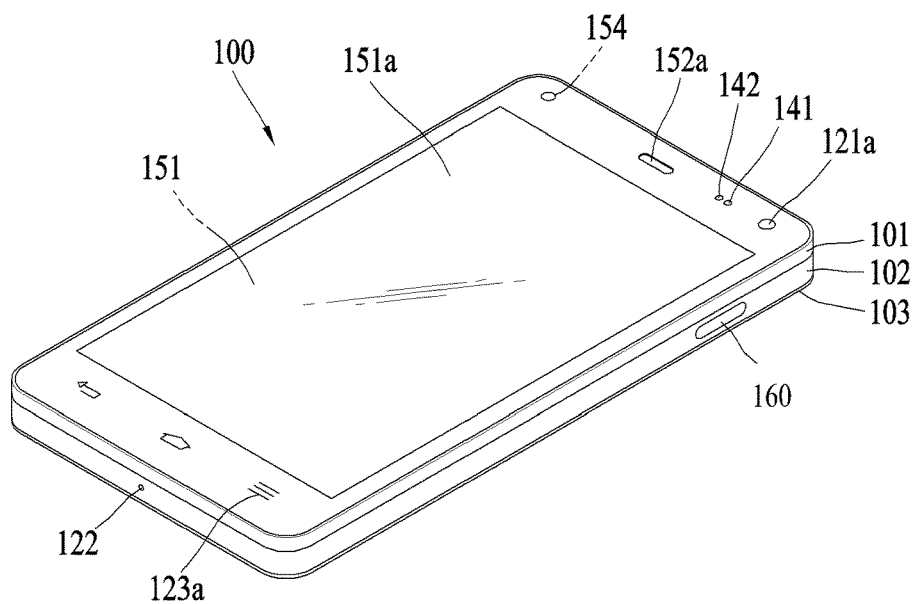
FIGS. 1B and 1C are conceptual views of one example of the mobile terminal, viewed from different directions.
Figure 1C:
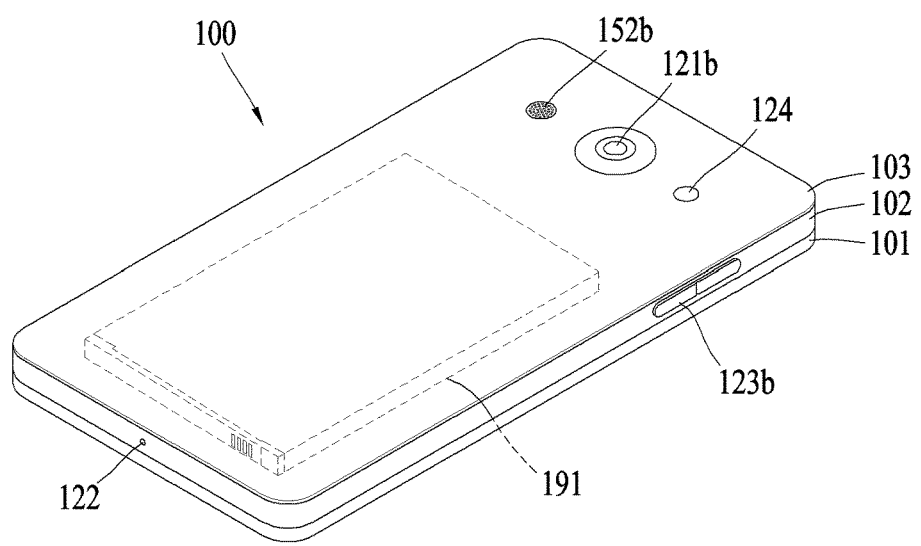

Reference is now made to FIGS. 1A to 1C, wherein FIG. 1A is a block diagram of a mobile terminal in accordance with the present disclosure, and FIGS. 1B and 1C are conceptual views of one example of the mobile terminal, viewed from different directions.

The mobile terminal 100 is shown as having components such as a wireless communication unit 110, an input unit 120, a sensing unit 140, an output unit 150, an interface unit 160, a memory 170, a controller 180, and a power supply unit 190. Implementing all of the illustrated components in FIG. 1A is not a requirement, and that greater or fewer components may alternatively be implemented.

More specifically, the wireless communication unit 110 typically includes one or more modules which permit communication such as wireless communication between the mobile terminal 100 and a wireless communication system, communication between the mobile terminal 100 and another mobile terminal, and communication between the mobile terminal 100 and an external server. Further, the wireless communication unit 110 typically includes one or more modules which connect the mobile terminal 100 to one or more networks.

To facilitate such communication, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, images, and the like) is obtained by the input unit 120 and may be analyzed and processed by the controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a fingerprint sensor, an ultrasonic sensor, an optical sensor (for example, a camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a healthcare sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown as having a display unit 151, an audio output module 152, a haptic module 153, and an optical output module 154. The display unit 151 may have an interlayered structure or an integrated structure with a touch sensor in order to realize a touchscreen. The touchscreen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed in the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output, or activating application programs stored in the memory 170.

To drive the application programs stored in the memory 170, the controller 180 can be implemented to control a predetermined number of the components mentioned above in reference with FIG. 1A. Moreover, the controller 180 can be implemented to operate two or more of the components provided in the mobile terminal 100 in combination to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized by driving one or more applications stored in the memory 170.

Hereinafter, referring to FIG. 1A, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast management entity via a broadcast channel. The broadcast channel may include a satellite channel, a terrestrial channel, or both. In some embodiments, two or more broadcast receiving modules 111 may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communication. Suitable technologies for implementing such short-range communications include Bluetooth™, Radio Frequency Identification (RFID), Infrared Data Association (IrDA), Ultra-WideBand (UWB), ZigBee, Near Field Communication (NFC), Wi-Fi, Wi-Fi Direct, Wireless USB (Wireless Universal Serial Bus), and the like. The short-range communication module 114 in general supports wireless communication between the mobile terminal 100 and a wireless communication system, communication between the mobile terminal 100 and another mobile terminal 100, or communication between the mobile terminal and a network where another mobile terminal 100 (or an external server) is located, via wireless area networks. One example of the wireless area networks is a wireless personal area network.

In some embodiments, another mobile terminal (which may be configured similarly to mobile terminal 100) may be a wearable device, for example, a smart watch, smart glasses or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Positioning System (GPS) module, a Wi-Fi module, or both. If desired, the location information module 115 may alternatively or additionally function together with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving external audio.

The user input unit 123 is a component that permits input by a user. Such user input may enable the controller 180 to control operation of the mobile terminal 100. The user input unit 123 may include one or more of a mechanical input element (for example, a key, a button located on a front and/or back surface or a side surface of the mobile terminal 100, a dome switch, a jog wheel, a jog switch, and the like), or a touch-sensitive input means, among others. As one example, the touch-sensitive input may be a virtual key or a soft key, which is displayed on a touchscreen through software processing, or a touch key which is located on the mobile terminal at a position that is different from that of the touchscreen. Further, the virtual key or the visual key may be displayed on the touchscreen in various shapes, for example, graphics, text, icons, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared light, or the like without a mechanical contact. The proximity sensor 141 may be arranged at an inner region of the mobile terminal covered by the touchscreen, or near the touchscreen.

The proximity sensor 141, for example, may include any of a transmissive type photoelectric sensor, a direct reflective type photoelectric sensor, a mirror reflective type photoelectric sensor, a high-frequency oscillation proximity sensor, a capacitive proximity sensor, a magnetic proximity sensor, an infrared proximity sensor, and the like. When the touchscreen is implemented as a capacitive type, the proximity sensor 141 can sense proximity of a pointer relative to the touchscreen by changes in an electromagnetic field, which is responsive to approach of an object with conductivity. In this instance, the touchscreen (touch sensor) may also be categorized as a proximity sensor.

The term "proximity touch" will often be referred to herein to denote the scenario in which a pointer is positioned to be proximate to the touchscreen without contacting the touchscreen. The term "contact touch" will often be referred to herein to denote the scenario in which a pointer makes physical contact with the touchscreen. For the position corresponding to the proximity touch of the pointer relative to the touchscreen, such position will correspond to a position where the pointer is perpendicular to the touchscreen. The proximity sensor 141 may sense proximity touch, and proximity touch patterns (for example, distance, direction, speed, time, position, moving status, and the like).

In general, controller 180 processes data corresponding to proximity touch and proximity touch patterns sensed by the proximity sensor 141, and cause output of visual information on the touchscreen. In addition, the controller 180 can control the mobile terminal 100 to execute different operations or process different data according to whether a touch with respect to a point on the touchscreen is either a proximity touch or a contact touch.

A touch sensor can sense a touch applied to the touchscreen, such as the display unit 151, using any of a variety of touch methods. Examples of such touch methods include a resistive type, a capacitive type, an infrared type, and a magnetic field type, among others. As one example, the touch sensor may be configured to convert changes in pressure applied to a specific part of the display unit 151, or convert capacitance occurring at a specific part of the display unit 151, into electrical input signals. The touch sensor may also be configured to sense not only a touched position and a touched area, but also touch pressure and/or touch capacitance. A touch object is generally used to apply touch input to the touch sensor. Examples of typical touch objects include a finger, a touch pen, a stylus, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touchscreen or a touch key provided in addition to the touchscreen. Whether to execute the same or different control according to the object which provides touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information related to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photosensor (or image sensors), and a laser sensor. Implementing the camera 121 with a laser sensor may allow detection of a touch of a physical object with respect to a 3D stereoscopic image. The photosensor may be laminated on, or overlapped with, the display device. The photosensor may be configured to scan movement of the physical object in proximity to the touchscreen. In more detail, the photosensor may include photodiodes and transistors at rows and columns to scan content received at the photosensor using an electrical signal which changes according to the quantity of applied light. Namely, the photosensor may calculate the coordinates of the physical object according to variation in light to thus obtain position information of the physical object.

The display unit 151 is generally configured to output information processed in the mobile terminal 100. For example, the display unit 151 may display execution screen information of an application program executed in the mobile terminal 100 or user interface (UI) and graphical user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glasses scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect of reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating event generation using light of a light source. Examples of events generated in the mobile terminal 100 may include message reception, call reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for verifying authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibration and audio which are output in response to touch inputs on the touchscreen.

The memory 170 may include one or more types of storage media including flash memory, a hard disk, a solid state drive, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disc, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform control and processing associated with voice calls, data communication, video calls, and the like, or perform pattern recognition processing to recognize a handwriting input or a picture drawing input performed on the touchscreen as characters or images, respectively. In addition, the controller 180 can control one or a combination of these components in order to implement various exemplary embodiments disclosed herein.

The power supply unit 190 may be provided with power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

The mobile terminal 100 may include a middle frame for supporting the back surface of the display unit 151 to provide rigidity. The middle frame may include a metal material for rigidity. In addition to providing rigidity to the mobile terminal, the middle frame may serve as a ground 105 with a large area including a conductive material, and may be connected to each electronic component such as an antenna to ground the components. The middle frame may be arranged so as not to be exposed to the outside, and may be integrated with the front case, which is located on the front surface of the body, or a side case, which is located on the side surface of the body.

As the multimedia function is extended, the display unit 151 is getting larger, and the bezel located around the display unit 151 is getting smaller. Particularly, the upper end portion of the display unit requires a space for arranging the camera 121, the audio output unit 152, the proximity sensor 141, and the like, while physical buttons are disposed at the lower end of the display unit. Accordingly, there is a limit in increasing the size of the display unit 151.

However, in recent years, the size of each component has been minimized and the user input unit 123 employing soft keys in place of physical buttons has been implemented. Thereby, the soft keys are displayed on the screen only when necessary, and disappear when unnecessary.

In some embodiments, electronic components may also be mounted to the rear case 102. Examples of such electronic components include a detachable battery 191, an identification module, a memory card, and the like. A rear cover is shown covering the electronic components, and this cover may be detachably coupled to the rear case 102. Therefore, when the rear cover is detached from the rear case 102, the electronic components mounted to the rear case 102 are externally exposed The cases 101, 102 may be formed by injection-molding synthetic resin or may be formed of a metal, for example, stainless steel (STS), aluminum (Al), titanium (Ti), or the like. As an alternative to the example in which the plurality of cases forms an inner space for accommodating components, the mobile terminal 100 may be configured such that one case forms the inner space. In this example, a unibody mobile terminal 100 is formed so a synthetic resin or metal extends from a side surface to a back surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the audio output module, the proximity sensor 141, the illuminance sensor 142, the optical output module 154, the camera 121, the user input unit 123, the microphone 122 and the interface unit 160.

As shown in FIGS. 1B and 1C, the display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and the interface unit 160 are arranged in a side surface of the terminal body, and the second audio output modules 151b and the second camera 121b are arranged in a back surface of the terminal body.

Alternative arrangements are possible and within the teachings of the present disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executed in the mobile terminal 100 or user interface (UI) and graphical user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, plural display units 151 may be arranged on one side, either spaced apart from each other, or these devices may be integrated, or these devices may be arranged on different surfaces.

The display unit 151 may also include a touch sensor which senses touch input received at the display unit. When touch is input to the display unit 151, the touch sensor may be configured to sense this touch and the controller 180, for example, may generate a control command or other signal corresponding to the touch. The content which is input in the touching manner may be text or a numerical value, or a menu item which can be indicated or designated in various modes.

The touch sensor may take the form of a film having a touch pattern, disposed between the window 151a and a display on a back surface of the window 151a, or a metal wire which is patterned directly on the back surface of the window 151a. Alternatively, the touch sensor may be integrally formed with the display. For example, the touch sensor may be disposed on a substrate of the display or within the display.

The display unit 151 may also form a touchscreen together with the touch sensor. Here, the touchscreen may serve as the user input unit 123 (see FIG. 1A). Therefore, the touchscreen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio may not be seen or is otherwise hidden in terms of appearance, thereby further simplifying the appearance and manufacture of the mobile terminal 100.

The optical output module 154 can be configured to output light for indicating event generation. Examples of such events include message reception, call signal reception, a missed call, an alarm, a schedule notice, email reception, information reception through an application, and the like. When a user has checked a generated event, the controller can control the optical output unit 154 to stop light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit 123c may be located on the back surface of the terminal body. The rear input unit 123c can be manipulated by a user to provide input to the mobile terminal 100. The input may be used in a variety of different ways. For example, the rear input unit 123c may be used by the user to provide an input for power on/off, start, end, scroll, control volume level being output from the first or second audio output modules 152a or 152b, switch to a touch recognition mode of the display unit 151, and the like. The rear input unit 123c may be configured to permit touch input, push input, or combinations thereof.

The rear input unit 123c may be located to overlap the display unit 151 of the front side in a thickness direction of the terminal body. As one example, the rear input unit 123c may be located on an upper end portion of the rear side of the terminal body such that a user can easily manipulate it using a forefinger when the user grabs the terminal body with one hand. Alternatively, the rear input unit 123c can be positioned at any location of the rear side of the terminal body.

Embodiments that include the rear input unit 123c may implement some or all of the functionality of the first manipulation unit 123a in the rear input unit 123c. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting reception of stereo sound.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as a Subscriber Identification Module (SIM), a User Identity Module (UIM), or a memory card for information storage.

The second camera 121b is shown located at the rear side of the terminal body and includes an image capturing direction that is substantially opposite to the image capturing direction of the first camera unit 121a. If desired, the second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images with better qualities may be captured in various manners using the plurality of lenses. A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used to implement a speakerphone mode for call communication.

At least one antenna for wireless communication may be located on the terminal body. The antenna may be installed in the terminal body or formed by the case. For example, an antenna which configures a part of the broadcast receiving module 111 (see FIG. 1A). It may be retractable into the terminal body. Alternatively, an antenna may be formed using a film attached to an inner surface of the rear cover, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending touch input to a touchscreen Hereinafter, embodiments related to a control method which may be implemented in the mobile terminal 100 configured as above will be described with reference to the accompanying drawings. It will be apparent to those skilled in the art that the present disclosure may be embodied in other specific forms without departing from the spirit or essential characteristics thereof.

As the multimedia function becomes important, wireless communication is performed by the mobile terminal 100 using various technologies such as short-range communication, long-range communication, or device-to-device communication. Since such technologies use different frequency bands (resonant frequencies), they need different antenna radiators.

In order to support transmission and reception of a large amount of data, 5G mobile communication technology, which enables quick transmission and reception of a large amount of data using millimeter waves of very high frequencies, is being developed beyond LTE, which is 4G mobile communication technology. 5G mobile communication technology uses signals of very high frequencies.

The antennas used in conventional mobile communication have a radiation pattern in which an electromagnetic wave is radiated without directionality like a dipole antenna or a monopole antenna. These antennas lower the gain because a large amount of energy is consumed in transmitting signals. In this regard, if a transmission terminal employs a beam pattern radiation scheme for radiating a beam toward a reception terminal, the amount of energy required for mobile communication may be reduced.

The beam patterns of the respective antennas may be combined by using a plurality of radiation elements 200, thereby realizing a sharp beam pattern. An array antenna using the plurality of radiation elements 200 may further sharpen the beam pattern and transmit signals farther in a specific direction. The direction of the beam pattern can be adjusted by adjusting the power supplied to the plurality of radiation elements 200.

Because 5G mobile communication requires innovative increase in capacity (by 1000 times the capacity of LTE), ultra-high-frequency signals are used. Since the size and arrangement of the antenna radiators depend on the wavelength of the signal to be transmitted and received, the size of the antenna radiators may be reduced by using a signal of a very high frequency. The frequency band used in 5G is 28 GHz or more, and the wavelength is greatly shortened, compared to the high-frequency band used in LTE communication, which is 2.5 GHz.

When signals from a band of very high frequencies are used, the frequency band may be widened because the band ensures low interference with other signals, and accordingly the antenna performance may be improved. In addition, the size of the antenna radiator for a signal of a very high frequency band may be reduced. When an array antenna is implemented by arranging a plurality of small radiation elements 200 on a substrate made of an insulating material and a beam pattern is formed therewith, antenna performance may be increased by 10 times or more. Omnidirectional transmission leads to waste of energy. Wasted energy may be reduced by using an antenna of a beam pattern formed by an array antenna. In the 5G mobile communication technology, signals from a band of very high frequencies are transmitted and received through the array antenna.

Figure 2:
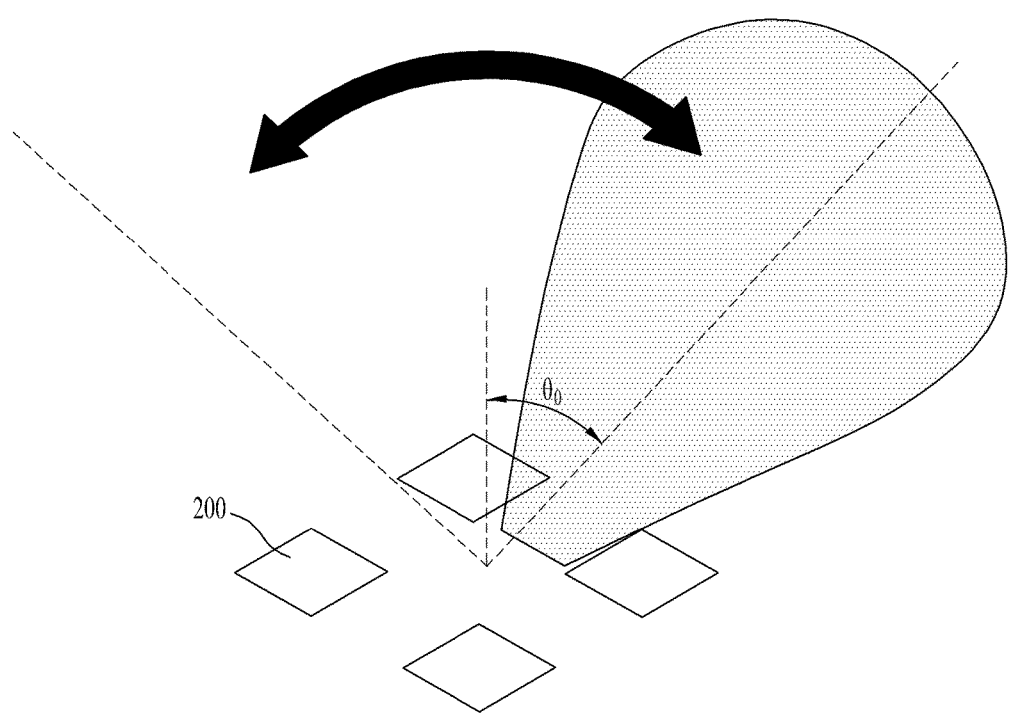
FIG. 2 is a diagram illustrating characteristics of a radiation element of a mobile terminal related to the present disclosure.

FIG. 2 is a diagram illustrating characteristics of the radiation element 200 of the mobile terminal 100 related to the present disclosure. As described above, a plurality of radiation elements 200 is arranged to form an array antenna. The array antenna can adjust the radiation direction within a predetermined angular range with respect to a direction perpendicular to the plane in which the radiation elements 200 are disposed. By adjusting the intensity of the power supplied to each of the radiation elements 200, the radiation performance of the radiation elements 200 having a higher power can be improved, and accordingly the direction of the beam radiated by the array antenna can be changed.

Figure 4:
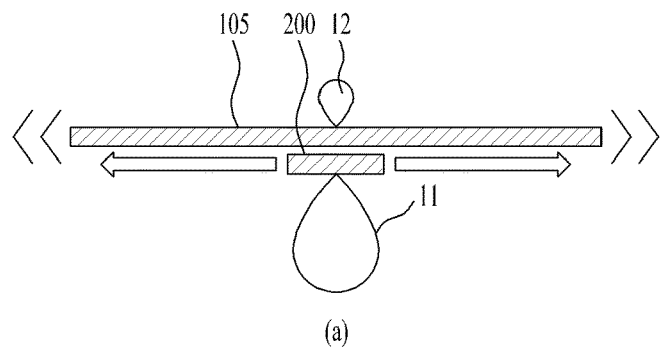
FIG. 4 includes views illustrating a relationship between the sizes of a sub-lobe and a ground of a radiation element of a mobile terminal related to the present disclosure.
Figure 4:
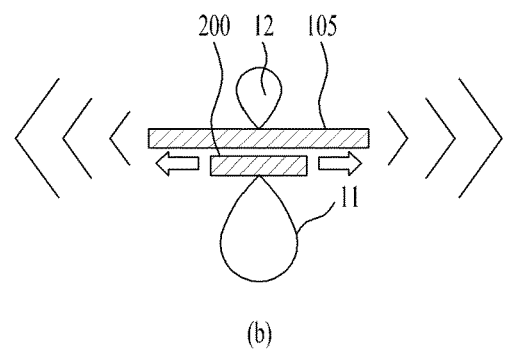
Figure 4:
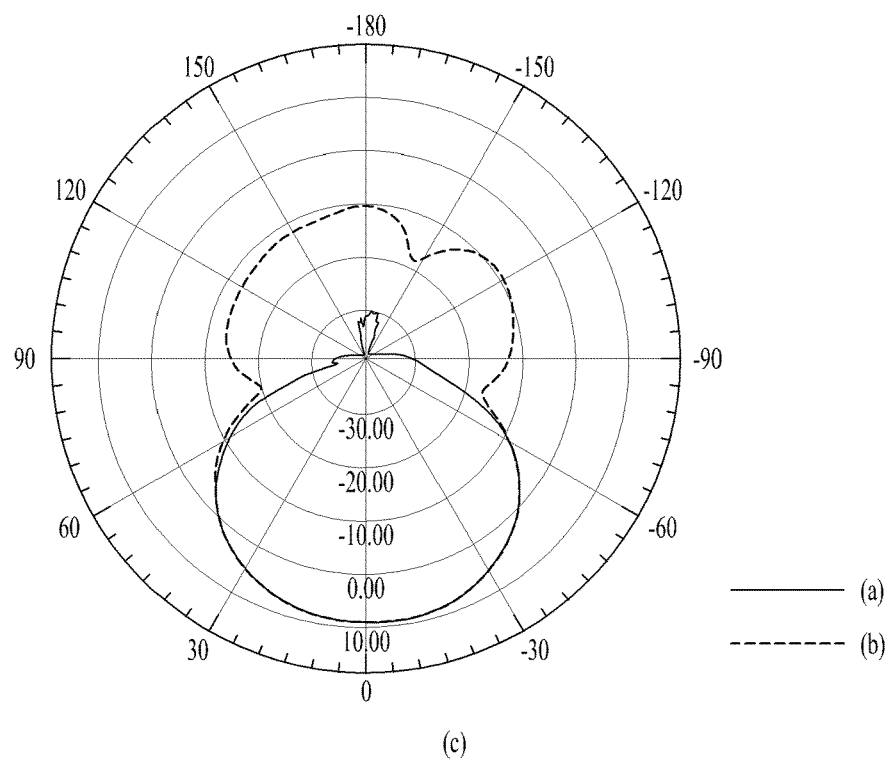

The display unit 151 located at the front includes a conductive material, and the middle frame, which supports the display unit 151 and serves as the ground 105 (FIG. 4) of the mobile terminal 100, also includes a metal material. Accordingly, the backward direction of the mobile terminal 100 is the main radiation direction of the array antenna.

Figure 3:
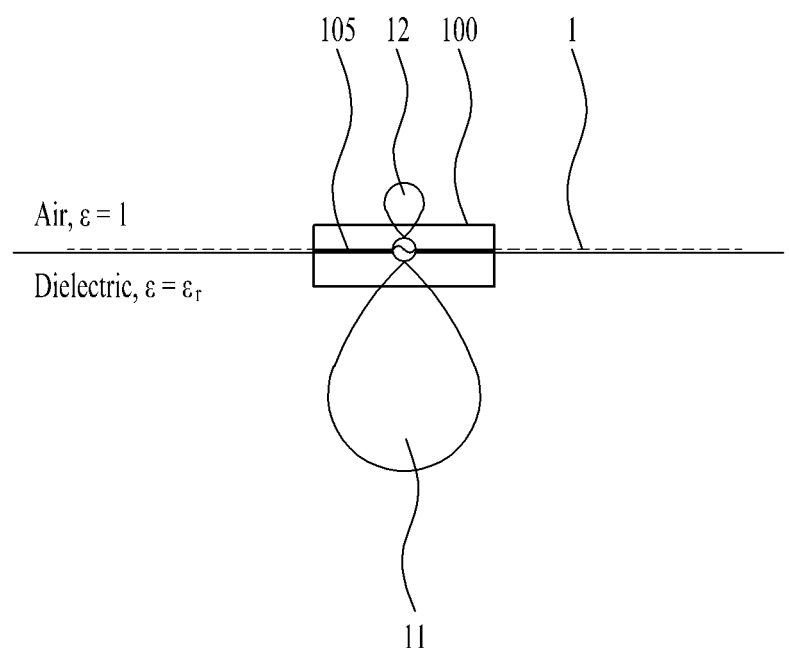
FIG. 3 is a diagram illustrating explaining performance when a mobile terminal according to an embodiment of the present invention is placed on a dielectric.

However, when the mobile terminal 100 is arranged such that the back surface thereof contacts the floor 1 as shown in FIG. 3, the backward direction in which the array antenna radiates a beam points toward the floor 1, which may result in degradation of wireless communication performance. Particularly, when the mobile terminal is placed on a dielectric such as a desk, the density of radiation power is biased to a portion having higher permittivity ε, and thus radiation is intensified in the backward direction of the mobile terminal 100.

As shown in FIGS. 2 and 3, when distribution of electromagnetic wave energy is conceptually presented, a radiation group radiated in a specific direction is called a lobe. Increase in size of the lobe means increase in the amount of radiation, and the array antenna radiates beams mainly in the backward direction of the mobile terminal 100 as described above. Therefore, a main lobe 11 faces in the backward direction of the mobile terminal 100, while a sub-lobe 12 is formed in a direction opposite to the direction of the main lobe 11.

For a typical patch antenna, the size of the front lobe is similar to that of the back lobe. For the array antenna, however, the sub-lobe 12 is smaller than the main-lobe 11. Since the display unit 151 and the middle frame serving as the ground 105 are positioned in front of the array antenna, the sub-lobe 12 facing in the forward direction of the mobile terminal 100 is smaller than the main lobe 11.

FIGS. 4(a) and 4(b) are views illustrating a relationship between the sizes of the sub-lobe 12 and the ground 105 of the radiation element 200 of the mobile terminal 100 related to the present disclosure. FIG. 4(a) shows the main lobe 11 and the sub-lobe 12 when the ground 105 is large, and FIG. 4(b) shows the main lobe 11 and the sub-lobe 12 when the ground 105 is small. FIG. 4(c) is a graph depicting the radiation patterns of FIGS. 4(a) and 4(b).

Even when the ground 105 is positioned in front of the radiation element 200, the sub-lobe 12 may be formed in front of the radiation element 200. As shown in FIG. 4(a), the electromagnetic wave energy radiated by the array antenna in the forward direction of the mobile terminal 100 is interrupted by the ground 105 and thus cannot be radiated forward. However, a part of the wave is transmitted toward an end of the ground 105 along the ground 105. This wave is referred to as a surface wave. When the surface wave reaches the end of the ground 105, radiation occurs at the end of the ground 105, thereby forming the sub-lobe 12 in the forward direction of the mobile terminal 100.

The ground 105 given in FIG. 4(b) is smaller than in FIG. 4(a). As the size of the ground 105 decreases, electromagnetic wave energy transmitted to the end of the ground 105 in the form of the surface wave increases. Therefore, as shown in FIG. 4(b), the sub-lobe 12 facing in the forward direction (upper side in the figure) of the mobile terminal 100 in FIG. 4(b) is larger than that in FIG. 4(a).

Increasing the amount of the surface wave reaching the end of the ground 105 can increase the size of the sub-lobe 12 facing in the forward direction of the mobile terminal 100. Accordingly, as shown in FIG. 5(a), the present disclosure utilizes the metal plate 210 in order to reflect the electromagnetic wave energy traveling in the backward direction of the mobile terminal 100 forward of the mobile terminal 100. The metal plate 210 of the present disclosure is a member having a plate shape. The metal plate 210 is arranged to cover the back surface of the radiation element 200 such that the radiation element 200 is positioned between the ground 105 and the metal plate 210. In other words, the metal plate 210 may be positioned on the back surface of the mobile terminal 100 and form at least a part of the rear case 102.

Figure 5:
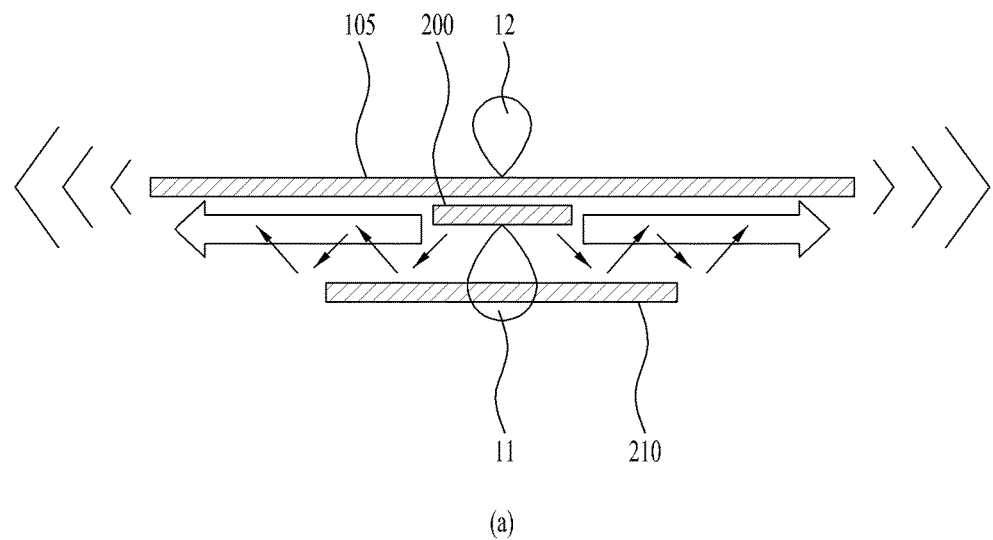
FIGS. 5 to 7 are views illustrating radiation performance according to the sizes of a ground and a metal plate of a mobile terminal related to the present disclosure.
Figure 6:
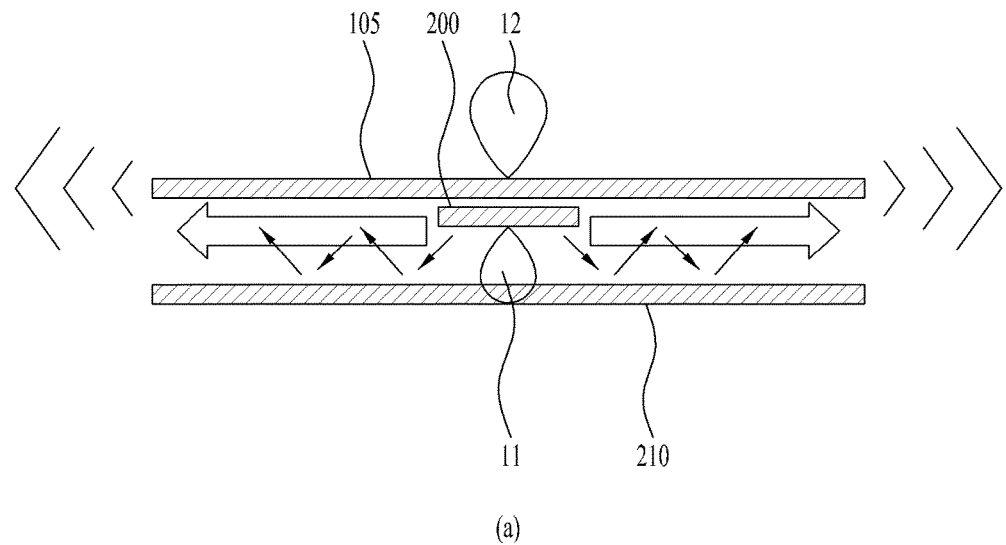
Figure 7:
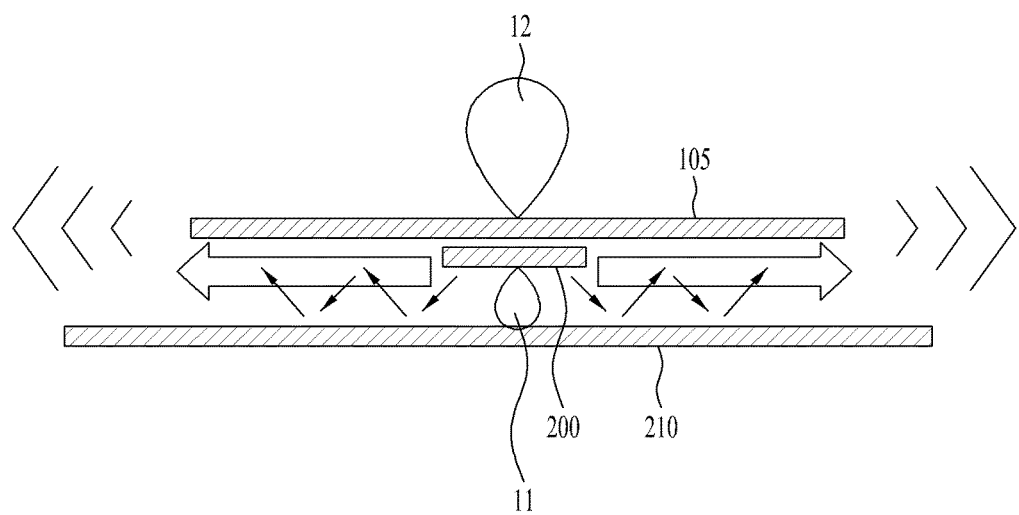
Figure 7:
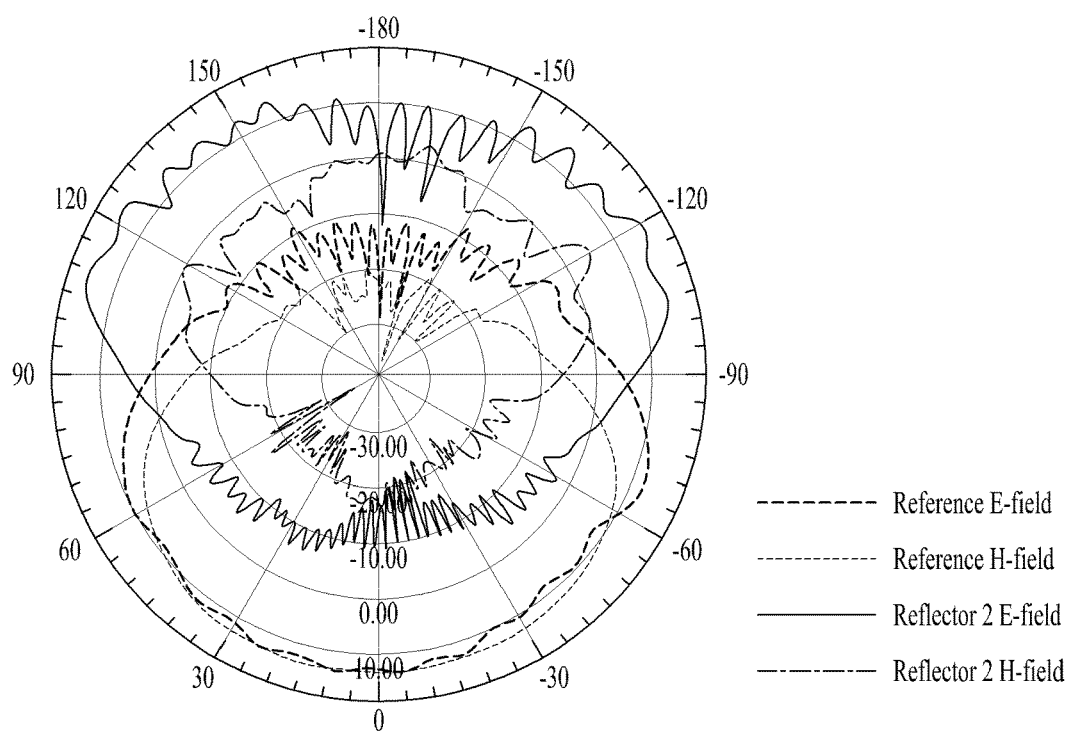

FIGS. 5 to 7 are views illustrating radiation performance according to the sizes of a ground 105 and a metal plate 210 of a mobile terminal 100 related to the present disclosure. FIGS. 5(a), 6(a), and 7(a) illustrate various embodiments of different sizes of the metal plate 210, and FIG. 5(b)5(b) shows an electric field (E-field) and a magnetic field (reference H-field) formed in the case of FIG. 5(a) where the metal plate 210 is smaller than the ground 105.

FIG. 6(b) shows an electric field (reference E-field) and a magnetic field (reference H-field) formed in the case of FIG. 6(a) where the size of the metal plate 210 is equal to that of the ground 105, and FIG. 7(b) shows an electric field (reference E-field) and a magnetic field (reference H-field) formed in the case of FIG. 7(a) where the metal 210 is larger than the ground 105. The embodiments can be compared with each other in terms of the sizes of the main-lobe 11 and the sub-lobe 12.

The metal plate 210 of the present disclosure reflects the electromagnetic wave energy radiated from the radiation element 200 to strengthen the electromagnetic wave energy transmitted in the form of the surface wave traveling along the ground 105. That is, the metal plate 210 increases the electromagnetic wave energy radiated forward of the mobile terminal 100, and prevents performance of the mobile terminal 100 from being degraded when the mobile terminal 100 is placed on the floor surface 1.

When the metal plate 210 is smaller than the ground 105 as shown in FIG. 5(a), the amount of electromagnetic wave energy reflected by the metal plate 210 is small. The magnetic field (Reflector 1 H-field) and the magnetic field (Reflector 1 H-field) formed when the metal plate 210 smaller than the ground 105 is positioned on the back surface of the radiation element 200 do not differ greatly from the reference E-field and the reference H-field formed in the absence of the metal plate 210 (see FIG. 5(b)).

As shown in FIG. 6(a), when the size of the metal plate 210 is equal to the size of the ground 105, the magnitude of the electromagnetic wave energy reflected by the metal plate 210 becomes large, and thus the electric field and the magnetic field (Reflector 2 E-field and Reflector 2 H-field) larger than the reference E-field and the reference E-field are formed in the forward direction (to the upper side in the figure) of the mobile terminal 100 (see FIG. 6(b)).

As shown in FIG. 7(a), when the metal plate 210 is larger than the ground 105, the electric field and the magnetic field (Reflector 2 E-field and Reflector 2 H-field) larger than in the case of the FIG. 5(a) are formed in the forward direction of the mobile terminal (to the upper side in the figure), and thus the direction of the main lobe 11 is substantially changed (see FIG. 7(b)).

This structure can change the direction of the main lobe 11 to the forward direction. However, if the mobile terminal is not placed on the floor surface 1, performance may be lower than when a technique of transmitting electromagnetic wave energy in a specific direction as in the case of the array antenna is used.

Figure 8:
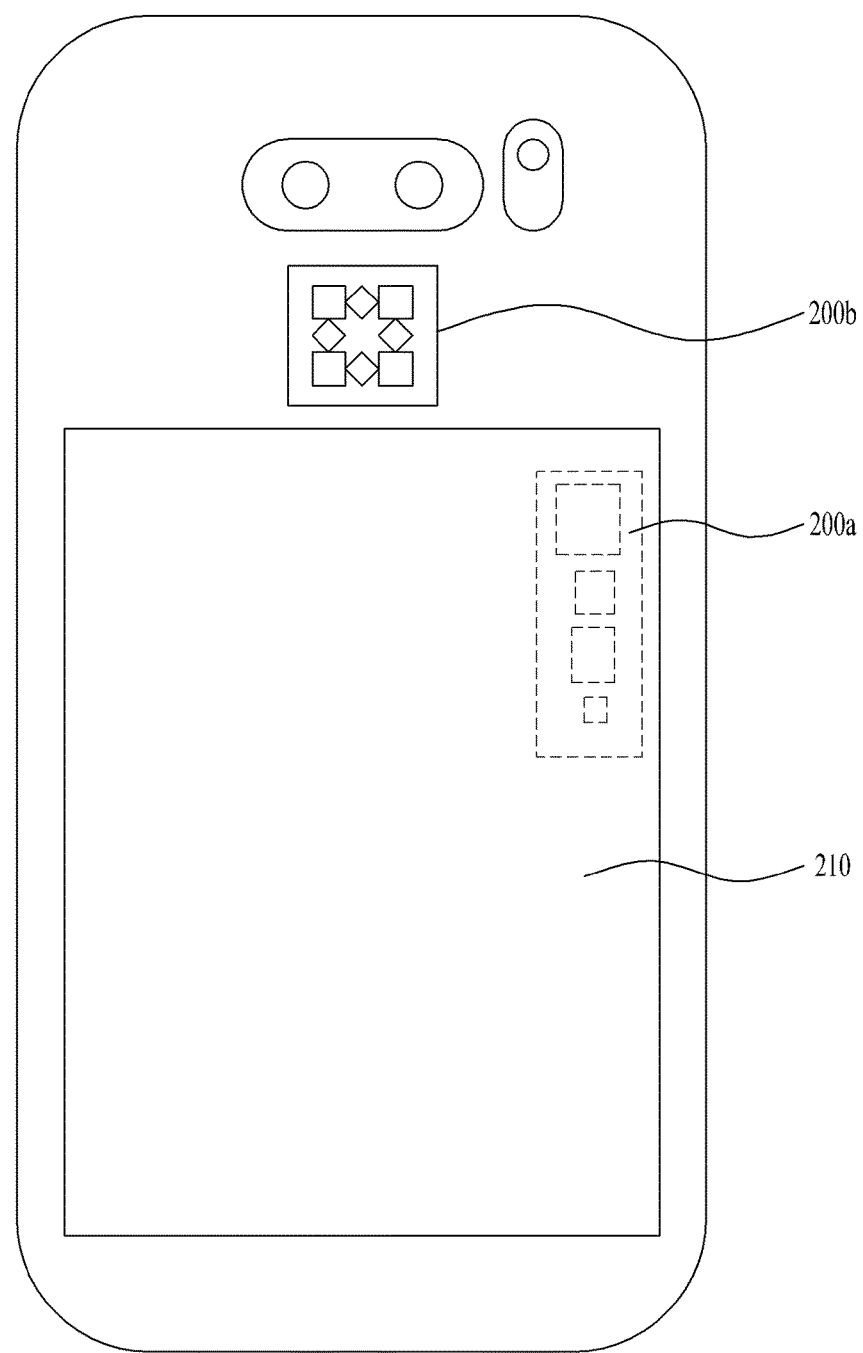
FIG. 8 is a diagram illustrating another embodiment of a mobile terminal according to an embodiment of the present invention.

Therefore, as in another embodiment of the mobile terminal 100 related to the present disclosure shown in FIG. 8, a plurality of radiation elements 200 for transmitting and receiving a signal of a high-frequency band may be provided, and different radiation elements 200 can be used depending on the situation to secure wireless communication performance higher than or equal to a certain level. As shown in FIG. 8, a first radiation element 200a may be disposed at a position overlapping the metal plate 210 and a second radiation element 200b can be separately disposed at a position which is not covered by the metal plate 210.

Since the first radiation element 200a needs to transmit electromagnetic wave energy in the forward direction of the mobile terminal 100, a patch antenna having a relatively large sub-lobe 12 may be used in place of an antenna having high directionality such as the array antenna. The patch antenna is capable of transmitting and receiving signals using a conductive strip of a size corresponding to the frequency magnitude of the signal.

As the position of the radiation element 200 is shifted from the middle of the ground 105 to the end of the ground 105, the electromagnetic wave energy reaching the end of the ground 105 increases and the magnitude of the electromagnetic wave energy radiated in the forward direction of the mobile terminal 100 increases. Accordingly, the radiation element may be disposed biased to the end of the ground 105.

When the radiation element 200 and the metal plate 210 are arranged close to each other, the bandwidth becomes shorter than that of the conventional antenna, and thus it is difficult to satisfy frequencies for the respective communication operators, which are slightly different from each other. In order to address this issue, the present disclosure may provide a plurality of patch antennas of different sizes, and the controller may select one of the patch antennas to selectively perform wireless communication according to the operators.

As described above, the radiation element 200 of the mobile terminal 100 according to the present disclosure can transmit electromagnetic wave energy in the forward direction of the mobile terminal 100 even if the mobile terminal 100 is placed with the back surface of the mobile terminal 100 contacting the floor surface 1. Accordingly, the present invention prevents performance deterioration.

As the present features may be embodied in several forms without departing from the characteristics thereof, it should also be understood that the above-described embodiments are not limited by any of the details of the foregoing description, unless otherwise specified, but rather should be considered broadly within the scope as defined in the appended claims, and therefore all changes and modifications that fall within scope of the claims, or equivalents of such scope, are therefore intended to be embraced by the appended claims.

What is claimed is:

1. A mobile terminal comprising:
   a body having a display unit mounted on a front surface of the body;
   a ground frame located on a back surface of the display unit and supporting the display unit;
   a first radiation element mounted on the body below the ground frame and configured to radiate an electromagnetic wave comprising a main lobe radiating in a backward direction of the mobile terminal toward a back surface of the body and a sub lobe radiating toward the front surface of the body;
   a metal plate disposed below the first radiation element and configured to reflect the electromagnetic wave comprising the main lobe in a forward direction to cause a surface wave along the ground frame and increase a size of the sub lobe radiating toward the front surface of the body; and
   a controller configured to apply power to the first radiation element to control the electromagnetic wave to be radiated,
   wherein a size of the metal plate is greater than or equal to the size of the ground frame.

2. The mobile terminal according to claim 1, wherein the metal plate is a rear case located on a back surface of the body.

3. The mobile terminal according to claim 1, wherein the first radiation element is a patch antenna in a form of a conductive metal foil.

4. The mobile terminal according to claim 3, wherein the first radiation element comprises a plurality of different sized patch antennas, and
   wherein the controller selectively applies power to at least one of the plurality of patch antennas to radiate the electromagnetic wave.

5. The mobile terminal according to claim 1, wherein the first radiation element is an array antenna configured to radiate the electromagnetic wave toward the back surface of the body.

6. The mobile terminal according to claim 1, further comprising:
   a second radiation element mounted on the body so as not to overlap the metal plate,
   wherein the controller selectively applies power to the first radiation element and the second radiation element to radiate the electromagnetic wave.

7. The mobile terminal according to claim 1, wherein the radiation element is disposed adjacent to an edge of the ground frame.

8. The mobile terminal according to claim 1, wherein the electromagnetic wave radiated by the radiation element is a high-frequency signal of 28 GHz or more.

9. The mobile terminal according to claim 1, wherein the backward direction of the mobile terminal is a main radiation direction of the array antenna.

10. The mobile terminal according to claim 1, wherein the sub lobe is formed in a direction opposite to the direction of the main lobe.

11. The mobile terminal according to claim 1, wherein the surface wave is a part of the wave transmitted toward ends of the ground frame along the ground frame.

12. The mobile terminal according to claim 1, wherein the sub lobe decreases in size with an increase in size of the ground frame.

13. The mobile terminal according to claim 1, wherein a first gap exists between the ground frame and the first radiation element and a second gap exists between the first radiation element and the metal plate.

14. The mobile terminal according to claim 13, wherein the second gap is larger than the first gap.

15. The mobile terminal according to claim 1, wherein the metal plate is arranged to cover a lower surface of the first radiation element.

16. The mobile terminal according to claim 1, wherein the size of the metal plate is substantially equal to the size of the ground frame.

17. The mobile terminal according to claim 1, wherein the size of the metal plate is greater than the size of the ground frame.

* * * * *